United States Patent
Giering et al.

(10) Patent No.: US 9,540,771 B2
(45) Date of Patent: *Jan. 10, 2017

(54) SECURITY FEATURE HAVING SEVERAL COMPONENTS

(71) Applicant: GIESECKE & DEVRIENT GMBH, Munich (DE)

(72) Inventors: Thomas Giering, Kirchseeon (DE); Johann Kecht, Munich (DE); Stephan Steinlein, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 125 days.

This patent is subject to a terminal disclaimer.

(21) Appl. No.: 14/365,266

(22) PCT Filed: Dec. 19, 2012

(86) PCT No.: PCT/EP2012/005276
§ 371 (c)(1),
(2) Date: Jun. 13, 2014

(87) PCT Pub. No.: WO2013/091859
PCT Pub. Date: Jun. 27, 2013

(65) Prior Publication Data
US 2014/0367958 A1 Dec. 18, 2014

(30) Foreign Application Priority Data
Dec. 23, 2011 (DE) ........................ 10 2011 122 240

(51) Int. Cl.
| | |
|---|---|
| C09D 5/22 | (2006.01) |
| D21H 21/48 | (2006.01) |
| B42D 15/00 | (2006.01) |
| B42D 25/00 | (2014.01) |
| B41M 3/14 | (2006.01) |
| B42D 25/29 | (2014.01) |

(52) U.S. Cl.
CPC .......... *D21H 21/48* (2013.01); *B42D 15/0013* (2013.01); *B42D 15/10* (2013.01); *C09D 5/22* (2013.01); *B41M 3/144* (2013.01); *B42D 25/29* (2014.10); *B42D 2033/18* (2013.01)

(58) Field of Classification Search
CPC ......... C09K 11/025; C09B 5/22; B41M 3/144; B42D 25/36; B42D 25/382
See application file for complete search history.

(56) References Cited

U.S. PATENT DOCUMENTS

| | | | |
|---|---|---|---|
| 3,980,887 A | 9/1976 | Mattis et al. | |
| 3,981,819 A | 9/1976 | Yocom et al. | |
| 4,014,812 A | 3/1977 | Kelsey, Jr. et al. | |
| 4,452,843 A | 6/1984 | Kaule et al. | |
| 4,463,970 A * | 8/1984 | Kaule ................... | B41M 3/144 283/72 |
| 5,569,317 A * | 10/1996 | Sarada .................. | C09D 11/50 347/100 |
| 6,174,400 B1 | 1/2001 | Krutak, Sr. et al. | |
| 6,344,261 B1 | 2/2002 | Kaule et al. | |
| 6,802,992 B1 | 10/2004 | Wieczoreck et al. | |
| 8,663,820 B2 | 3/2014 | Giering et al. | |
| 9,224,082 B2 * | 12/2015 | Ebert .............. | G06K 19/06009 |
| 2004/0105962 A1 | 6/2004 | Giering et al. | |
| 2007/0295116 A1 * | 12/2007 | Le Mercier ........ | C09K 11/7777 73/866 |
| 2010/0026991 A1 * | 2/2010 | Heer ..................... | B41M 3/144 356/71 |
| 2011/0079733 A1 | 4/2011 | Langhals et al. | |
| 2012/0256409 A1 * | 10/2012 | Giering ................ | C09K 11/71 283/85 |
| 2013/0193346 A1 * | 8/2013 | Justel ................. | C09K 11/7733 250/459.1 |

FOREIGN PATENT DOCUMENTS

| | | |
|---|---|---|
| DE | 3048734 A1 | 7/1982 |
| DE | 19804021 A1 | 8/1999 |
| DE | 10056462 A1 | 5/2002 |
| DE | 10111116 A1 | 9/2002 |
| EP | 0966504 B1 | 11/2005 |
| EP | 1647946 * | 2/2006 |
| WO | 8103507 A1 | 12/1981 |
| WO | 2006047621 A1 | 5/2006 |
| WO | 2009005733 A2 | 1/2009 |
| WO | 2011084663 A2 | 7/2011 |
| WO | WO 2011/082794 * | 7/2011 |
| WO | WO 2011/098083 * | 8/2011 |
| WO | WO 2011/141467 * | 11/2011 |

OTHER PUBLICATIONS

International Preliminary Report on Patentability for corresponding International PCT Application No. PCT/EP2012/005276, Jun. 24, 2014.
International Search Report for corresponding International PCT Application No. PCT/EP2012/005276, Apr. 19, 2013.
Slooff et al., "Optical Properties of Erbium-Doped Organic Polydentate Cage Complexes," J. Appl. Phys., Jan. 1, 1998, pp. 497-503, vol. 83, No. 1.

* cited by examiner

Primary Examiner — Carol M Koslow
(74) Attorney, Agent, or Firm — Workman Nydegger

(57) ABSTRACT

A security feature has a luminescent component and a component camouflaging the luminescent component. A security feature has a luminescent component with at least one luminophore consisting of a doped host lattice, and a component camouflaging the luminescent component, wherein for camouflaging the luminescent component, relevant properties required for identifying the luminescent component are camouflaged by the camouflaging component by the relevant properties of the luminescent component. The relevant properties being camouflaged by the camouflaging component in at least two of the relevant properties by the camouflaging component having relevant properties that correspond to the respective relevant properties of the luminescent component, thereby impeding or preventing a recognition of the luminescent component.

18 Claims, No Drawings

SECURITY FEATURE HAVING SEVERAL COMPONENTS

BACKGROUND

This invention relates to a security feature having a luminescent component and a component camouflaging the luminescent component.

The designation "value document" is to be understood within the framework of the invention to refer to bank notes, checks, shares, tokens, identity cards, credit cards, passports and also other documents as well as labels, seals, packages or other elements for product authentication.

Securing value documents against forgery by means of security features having a luminescent component has been known for a long time. The luminescent component is formed here by substances which will hereinafter also be designated luminophores and are formed by host lattices doped with transition metals or rare earth metals as luminescent ions. Such ions have the advantage that, after being suitably excited, they show one or more characteristic narrow-band luminescences which facilitate a reliable detection and the delimitation over other spectra. For doping, combinations of transition metals and/or rare earth metals have also been discussed. Such substances have the advantage that, in addition to the above-mentioned luminescences, one observes so-called energy transfer processes, which can lead to more complicated emission spectra. In such energy transfer processes, one ion can transfer its energy to another ion and the spectra can then consist of several narrow-band lines which are characteristic of both ions.

The stated security features for securing value documents have as a luminescent component individual luminophores whose emissions differ with regard to their spectral and/or temporal properties. The security features are incorporated into and/or applied to value documents in different forms of use. There can also be employed for the luminescent component a combination of luminophores. The emission bands of the employed luminophores constitute a spectral coding. Several different luminophores can be combined into systems, with the individual systems being independent of each other. The emission of the employed luminophores is also designated luminescence, whereby this may involve fluorescence and/or phosphorescence.

It is also known that the described security features are not formed solely by the luminescent component. As a further component, some security elements have a component that is used for camouflaging the luminescent component. For example, DE 30 48 734 A1 describes a security paper having camouflage substances protecting the authentication features. The camouflage substances of the camouflaging components correspond here substantially to the luminescent components, i.e. very similar or like-kind host lattices and dopants are employed for both the luminescent component and the camouflaging component. However, when manufacturing the camouflage substances for the camouflaging component it is made sure that the camouflage substances have no luminescent properties. For this purpose, parameters in the annealing or grinding process are for example changed for the camouflaging component in contrast to the manufacture of the luminescent component. Alternatively, so-called luminescence killers are employed. This prevents the luminescent component from being distinguished from the camouflaging component using conventional methods of analysis technology. By this means, primarily the position of the luminescent component is concealed, since it cannot be distinguished from the camouflaging component using conventional methods.

Since the luminescent component and camouflaging component involve very similar or even the same substances, no camouflage of the substance-based identity of the luminescent component is obtained, since the employment of the camouflaging component increases the total examinable quantity of material of the security feature in the value document to be secured, thereby tending to facilitate rather than impede the analyzability of the security feature or the luminescent component.

SUMMARY

Starting out from this prior art, the invention is based on the object of specifying a security feature having a luminescent component and a component camouflaging the luminescent component wherein the analysis of kind and doping of a host lattice employed for the luminescent component is to be prevented or at least substantially impeded. The security feature is incorporated into the volume of a value document consisting of paper and/or plastic or applied thereon. When applied to the value document the security feature may be applied as an invisible, at least partial coating.

It is hence the function of the camouflaging component to make one or more of these aspects harder to analyze, in order to thereby impede an imitation of the security feature.

It is preferably intended here that a camouflage of the luminescent component be obtained both with regard to an elemental analysis and with regard to a structural analysis. The identification of the luminescent component is also to be impeded in case the security feature is present in pure form prior to incorporation into value documents and in diluted form e.g. through ashing of authentic value documents, and can then be examined by means of elemental analysis methods such as XRF (X-ray fluorescence analysis) or ICP-AES (inductively coupled plasma optical emission spectrometry) or structural analysis methods such as X-ray powder diffractometry.

In a preferred embodiment, the spectral properties of the security feature are alternatively or additionally to be camouflaged, so that upon simple spectral analysis, e.g. upon continuous and/or unspecific excitation of the value document and detection of the arising luminescence emission, it is not the correct spectral signature of the luminescent component that is measured.

In so doing, it is moreover to be achieved that the quality of the security feature is not influenced by production-related fluctuations, and is unambiguously identifiable later so that it can e.g. be associated with a certain producer.

DETAILED DESCRIPTION OF VARIOUS EMBODIMENTS

The invention starts out from a security feature having a luminescent component having at least one luminophore consisting of a doped host lattice, and a component camouflaging the luminescent component, wherein for camouflaging the luminescent component, relevant properties required for identifying the luminescent component are camouflaged by the camouflaging component by the relevant properties of the luminescent component, namely the structure of the host lattice of the luminescent component, the stoichiometry of the host lattice of the luminescent component, the elemental constitution of the host lattice of the luminescent component, the dopant or dopants of the luminescent component and the luminescence properties of the luminescent component, being camouflaged by the camouflaging component in at least two, particularly preferably in at least three, very particularly preferably in at least four, of the relevant properties by the camouflaging component having relevant properties that correspond to the respective relevant properties of the luminescent component, thereby impeding or preventing a recognition of the luminescent component.

For this purpose, it is provided in particular that an identification of the luminescent component is impeded or prevented by properties of the camouflaging component and respective like-kind properties of the luminescent component being characterized by the following relations:

a) the camouflaging component has an X-ray diffractogram, or X-ray diffraction pattern, which at least partly overlaps with the X-ray diffractogram of the luminescent component, in order to camouflage the structure of the luminescent component.

b) the camouflaging component contains at least one cationic element that is also contained in a host lattice of the luminescent component, but not all cationic elements contained in this host lattice, in order to camouflage the stoichiometry of the luminescent component, c) the camouflaging component contains at least one cationic element that is not contained in a host lattice of the luminescent component, in order to camouflage the elemental constitution of this host lattice of the luminescent component, d) the camouflaging component contains at least one dopant that is not contained in the luminescent component as a dopant, in order to camouflage the dopant or dopants of the luminescent component, e) the camouflaging component contains at least one luminophore that has a lower decay time than the luminophore contained in the luminescent component, in order to camouflage the spectral properties of the luminescent component, wherein the properties of the camouflaging component and of the luminescent component satisfy at least two, particularly preferably at least three, very particularly preferably at least four, of the relations stated in a) to e).

The camouflaging component has structural, spectral and elemental properties in order to camouflage the comparable properties of the luminescent component. The camouflaging component can consist of one substance, or consist of several substances. The camouflaging component can have an X-ray diffractogram that hides the X-ray diffractogram of the luminescent component. The camouflaging component can have, additionally or instead of the at least partly overlapping X-ray diffractogram, further structural features that at least partly match corresponding structural features of the luminescent component, in order to camouflage the structure of the luminescent component. By this means the identification of the structure of the matrix of the security feature is impeded. Further structural analysis methods can be applied, besides X-ray diffractometry, in order to analyze further structural features additionally or instead of the X-ray diffractogram, for example nuclear magnetic resonance spectroscopy methods such SS-NMR, electron spin resonance methods, or an analysis via Raman and IR spectroscopy methods. However, these further methods are only suitable for the structural analysis of inorganic luminophores to a very limited extent, due to low sensitivities or high required quantitative proportions of the species to be measured, limitations to a small number of specific elements/structural groups, or lack of clarity of the results. At best, they offer information about special structural segments such as structural groups, insertion positions or coordination spheres with specific signal positions, but no insight into the total structure. For camouflaging the structure a camouflaging component adapted to the X-ray diffractogram of the luminescent component is hence preferred.

When the security feature possesses especially specific, unambiguous, or easily identified signals in certain structural analysis methods due to certain employed elements or element groups, an additional protection can be built up by the camouflaging component likewise producing overlapping or additional signals in the corresponding certain structural analysis methods in order to thereby impede a structural analysis by these methods.

The camouflaging component can preferably likewise contain substances that impede an elemental analysis of the security feature, whereby one must distinguish different partial aspects to be camouflaged, namely the elements contained in the matrix, the stoichiometry of the matrix and the dopants of the matrix.

A camouflage of the elements contained in the matrix can be obtained e.g. by increasing the possible element combinations, i.e. by additional chemical elements being contained in the camouflaging component of the security feature in larger quantities which impede the correct allocation of the matrix elements of the luminescent component upon an elemental analysis.

A camouflage of the stoichiometry of the matrix can be obtained by substances of the camouflaging component whose elements wholly or partly match individual elements of the matrix of the security feature. This distorts the ratio, determinable by elemental analysis, between individual elements of the matrix of the luminescent component.

A camouflage of dopants of the matrix which respectively consist of rare earths and/or transition metals is obtained by adding further rare earth metal compounds or transition metal compounds in small quantities. This increases the number of possible combinations of the luminophores and sensitizers used, thereby impeding a correct analysis.

A camouflage of the spectral properties of the luminescent component can be effectuated by like-kind luminescence signals of the camouflaging component. However, it would be disadvantageous in the case of application, since additional, simultaneously detectable luminescence signals would impede or prevent an exact detection and assessment of the luminescent component. This is the case particularly when such additional luminescence signals lie in a similar or the same spectral region as the luminescence signals of the luminescent component, as would be necessary for an effective camouflage. Hence, the camouflaging component preferably contains no additional inorganic luminophores. Preferably, there can be employed organic luminophores which possess considerably lower decay times in order to wholly or partly hide the luminescence emission of the luminescent component. Upon continuous excitation, the specific luminescence spectrum of the inorganic luminescent component is thus hidden by the luminescence spectrum of the organic luminophore, and thus camouflaged. Upon pulsed excitation, the luminescence of the inorganic luminescent component can be measured and thus tested without disturbance, due to the fast decay time of the organic luminophore. When the exact measurement parameters (e.g. the pulsed excitation) are not known, the spectral properties of the luminescent component can hence not be correctly recognized.

Although organic luminophores are likewise designated luminophores, within the framework of this invention they are not to be classed with the luminescent component, since the latter refers exclusively to the inorganic luminophores detected for authentication.

Preferably, the camouflaging component hence contains one or more organic luminophores whose luminescence emission hides the luminescence emission of the luminescent component.

Preferably, individual substances of the camouflaging component perform several camouflage functions simultaneously. For example, the camouflaging-component substance camouflaging the X-ray diffractogram can simultaneously contain an element of the luminescent component and thus camouflage the stoichiometry of the matrix of the luminescent component.

In addition to the camouflaging component, the security feature can contain one or more additional functional components, for example a production component, for adjusting the signal intensity of the luminescence of the luminescent component to a presettable nominal value, or a coding component, for forensically marking the security feature. Preferably, these components likewise perform a camouflage function or are constituents of the camouflaging component.

Preferably, individual substances of the camouflaging component and/or of the additional components are so chosen that one or more of these substances are camouflaged against structural or elemental analysis by other substances of the camouflaging component, analogously to the luminescent component. For example, a substance camouflaging the stoichiometry of the luminescent component can simultaneously camouflage the stoichiometry of the coding component. The substance camouflaging the stoichiometry contains here both at least one same element as the luminescent component and at least one same element as the coding component. Likewise, the X-ray diffractogram of the production component can for example have a partly overlapping X-ray diffractogram with a camouflaging-component substance camouflaging the elemental composition of the luminophore matrix. This impedes a structural analysis both of the substance camouflaging the elemental composition and of the production component.

Of the relevant properties stated for camouflaging the luminescent component, namely
the structure of the matrix of the luminescent component,
the stoichiometry of the matrix of the luminescent component,
the elemental constitution of the matrix of the luminescent component,
the dopants of the luminescent component, and
the luminescence properties of the luminescent component,
at least two, particularly preferably at least three, very particularly preferably at least four, of the stated properties are camouflaged by the camouflaging component.

In a further preferred embodiment, at least the stoichiometry of the matrix, the elemental constitution of the matrix and the dopants of the luminescent component are camouflaged by the camouflaging component.

In a further preferred embodiment, at least the X-ray diffractogram and the stoichiometry of the luminescent component are camouflaged by the camouflaging component. Particularly preferably, the matrix elements and dopants of the luminescent component are additionally camouflaged here.

In a further preferred embodiment, at least the spectral properties as well as the stoichiometry, the elemental constitution of the matrix and the dopants of the luminescent component are camouflaged by the camouflaging component.

In a further preferred embodiment, the spectral properties as well as the X-ray diffractogram are camouflaged. Particularly preferably, the stoichiometry, the elemental constitution of the matrix and the dopants of the luminescent component are camouflaged in addition to the spectral properties and the X-ray diffractogram.

The different preferred embodiments take into consideration here that different camouflage aspects can take priority for different security features depending on the nature of the luminescent component. For example, a change of the stoichiometric ratios detected by elemental analysis is especially advantageous when the luminescent component involves a compound in which the luminescence properties can be changed by varying a relative ratio of two matrix constituents. Likewise, in the case of luminescent components having a crystal structure that forms isotypic structures with different elements, it may be particularly expedient to add several of such additional elements via the camouflaging component. In this case, even when the crystal structure of the luminescent component is completely decrypted, no simple inference about the elements of the luminescent component can be drawn.

Likewise, in the case of luminophores having highly structurally dependent emission spectra, as typically occur for example upon doping with transition metals, it may be especially advantageous to camouflage primarily the X-ray diffractogram, since here the structure constitutes an especially important factor for identifying the luminophore.

Likewise, in the case of a luminescent component having an emission spectrum especially specific to certain groups of materials or crystal structures, it may be preferred to attach special importance to camouflaging the spectral properties, so that the actual nature of the emission of the luminescent component can only be recognized through more complex spectral analyses.

The invention has the advantage that, through the individual constituents or substances of the camouflaging component, different aspects of the composition, structure or spectral properties of the luminescent component are so camouflaged, in dependence on the special properties of the respective luminescent component, that an identification and imitation of the luminescent component is impeded or impossible.

Further advantages of the present invention are to be found in the dependent claims and in the following description of embodiments.

Security features for securing or marking value documents having a luminescent component, on the basis of luminophores made of host lattices doped with transition metals or rare earth metals as luminescent ions and having specific properties in their emission and/or excitation, are known e.g. from WO 81/03507 A1, EP 0 966 504 B1, WO 2011/084663 A2, DE 198 04 021 A1 and DE 101 11 116 A1. Such security features are added either directly to the paper pulp in the form of a powder upon the manufacture of paper, or to other substrate materials of value documents, such as plastics. Alternatively or additionally, the powder is added to a printing ink which is then imprinted on the substrate of the value documents. The security feature can also be contained in other constituents of value documents, e.g. in threads, planchets, patches, etc., which are in turn incorporated into value documents or applied thereto.

The powdery security features having a luminescent component in the form of the above-mentioned luminophores moreover contain a component camouflaging the luminescent component. The camouflaging component is chosen here such that it leads to a hiding or camouflage of the luminescent component and/or hides its luminescence emission upon the structural and elemental analysis methods stated at the outset. For this purpose, the camouflaging component has for example an X-ray diffractogram that at least partly overlaps with the X-ray diffractogram of the luminescent component, as to be explained more precisely below. Through the at least partial congruence, or partial overlap, of the X-ray diffractograms in significant peaks of luminescent component and camouflaging component, it is therefore not possible, or at least only with substantial difficulty, to infer the luminescent component present in the security feature using common structural analysis methods such as X-ray powder diffractometry.

The goal of elemental analysis of the security feature is to obtain an inference about the identity of the employed host lattices through quantitative analysis of the constituents of the security feature. Methods such as e.g. XRF enable especially "difficult" elements to be readily detected. What is problematic, inter alia, is to quantify oxygen, which cannot be detected either by XRF or by ICP-AES or similar methods. Since oxygen usually forms the "remainder" of the matrix (e.g. as an oxide ion) after detection of the other constituents of the host lattice, however, its detection is not necessarily required for identifying the host lattice. When the cationic constituents of the host lattice have been quantified, the contained host lattices can be identified by forming the ratio of the constituents even in mixtures of different substances. Thus, for example, a mixture of $ZnAl_2O_4$ and $BaMnO_4$ always contains Zn and Al in a ratio of 1:2, and Ba and Mn always in a ratio of 1:1, independently of the mix ratio of the two elements. It is thus obvious to respectively assign these constituents to a host lattice, by which the latter can be identified.

To prevent or at least impede such a procedure, the respective substances whose stoichiometry is to be camouflaged, in particular the luminescent component, must have at least one common element with another substance of the camouflaging component. The proportion of the respective chemical element must be present here in a sufficient order of magnitude to significantly distort the forming of a ratio from the elemental analysis. For example, in a mixture of $ZnMn_2O_4$ and $BaMnO_4$ no correct integral ratio will be found between the proportions of Zn and Mn or between Ba and Mn, since Mn is present in both host lattices forming the components or substances. Preferably, the detected quantitative proportion of the overlapping chemical element of a compound is elevated relative to the pure compound by at least 30%, preferably at least 50%, particularly preferably at least 100%. The quantitative proportion can also be elevated by at least 200%.

To obtain the camouflage of the stoichiometry of the luminescent component by the camouflaging component, the camouflaging component has at least one element of the substance forming the luminescent component. An element is to be understood here as a chemical element that is contained both in the substance forming the luminescent component and in the substance forming the camouflaging component. In particular, element or chemical element is not to be understood to mean that one or more identical atoms are constituents of two components. When the substance forming the luminescent component has for example the elements A and B, a substance forming the camouflaging component can have the elements A and C or B and C, where the elements A, B and C are not formed by oxygen or hydrogen. Besides the elements A, B and C, the substances can have further elements, in particular also oxygen and/or hydrogen. However, oxygen and hydrogen are not to be viewed as elements that effectuate an interlacing of the substances as intended by the present invention. Suitable elements are especially cationic matrix constituents, in particular cations of metals, transition metals, semimetals and rare earths. Element cations can, through the additional inclusion of oxygen, also form anionic sub-groups as matrix constituents which are likewise suitable for interlacing. Thus, for example, cations of phosphorus and of silicon can be present in a matrix e.g. in the form of phosphates and silicates. An interlacing of the substances as intended by the present invention can be formed by the main group elements Li, Be, B, Na, Mg, Al, Si, P, S, K, Ca, Ga, Ge, As, Se, Rb, Sr, In, Sn, Sb, Te, Cs, Ba, Tl, Pb, Bi, and by arbitrary elements of the transition metals and rare earths.

The above-described elements or chemical elements as intended by this invention are therefore alternatively also designated cationic elements, cationic matrix constituents, cationic constituents of the host lattice, or element cations. This is supposed to clearly express that in particular the chemical elements oxygen and/or hydrogen are not viewed as the chemical elements that effectuate an interlacing of the substances as intended by the present invention.

For camouflaging the elemental composition of the matrix of the luminescent component there can moreover be added to the security feature via a substance of the camouflaging component at least one new cationic element not contained in the matrix. This increases the number of the chemical elements detected in an elemental analysis, thereby making it harder to determine the composition of the matrix. Preferably, the additional cationic elements are added to the luminescent component in a quantity of at least 30%, preferably at least 50%, particularly preferably at least 80%, of the molar quantity of a cationic matrix element, preferably of the most frequent cationic matrix element. In so doing, there are added through the camouflaging component at least one, preferably at least two, particularly preferably at least three, additional cationic elements.

For camouflaging one or more dopants of the matrix of the luminescent component, additional luminophores and/or sensitizers are added to the camouflaging component, so that upon elemental analysis the possible combinations for dopants of the luminophore matrix are increased. For camouflaging rare earth dopants there are hence preferably employed the rare earths Ce, Pr, Nd, Sm, Eu, Tb, Dy, Ho, Er, Tm, Yb. These are either luminophores luminescing in the NIR region, or sensitizers or dopants that can have an influence on the luminescence properties of rare earth luminophores via their electronic structure, e.g. through energy transfer or quenching effects, and are hence often to be found as codopings. For camouflaging transition metal luminophores, e.g $Cr^{3+}$, there can preferably also be used, besides the above-mentioned rare earths, other transition metals that are known as luminophores. For example, in the case of Cr as a luminophore, there can preferably be effected for camouflage an addition of Mn or Fe compounds. In like manner, where the dopant of the luminescent component is a transition metal of the fourth period of the periodic system, a camouflaging component containing at least one other dopant consisting of the elements of the fourth period of the periodic system can preferably be used.

For camouflaging the dopants of the matrix of the luminescent component, at least one additional dopant element is added, preferably at least two additional elements. The elements added to the camouflaging component for camouflaging the dopants should be present in a comparable molar quantity relative to a dopant of the luminescent component. Comparable is intended here to mean that the molar quantity of the addition amounts to at least 30% of the molar quantity of a dopant of the luminescent component. The rare earth metals can be firmly inserted into the lattice of another substance here, or also, e.g. if a direct insertion into the matrix of a substance proves to be technically disadvantageous or is awkward, preferably be admixed to the camouflaging component as an additional separate substance. When a separate rare earth-containing substance is used, its proportion in the total mixture preferably amounts to 0.5 to 4%, particularly preferably 1 to 2%.

For camouflaging the luminescence properties of the luminescent component there are preferably used organic or metalorganic luminophores. These should possess low decay times of less than 10 µs, preferably less than 1 µs, in order not to impair the detection of the inorganic luminescent component. Their luminescence emission should wholly or partly hide the region of the luminescence emission of the inorganic luminescent component. The luminescence emission of the organic luminophore can also be broad and/or unstructured, in contrast to that of the inorganic luminophore. Preferably, the organic luminophore luminesces exclusively in the non-visible region, in order not to cause any unwanted visible luminescences of the value document. The organic luminophore may involve for example laser dyes, metal complexes or other NIR illuminants, e.g. security markers. Metalorganic security markers and organic NIR luminophores are known for example from the prints WO 2009/005733 A2, U.S. Pat. No. 6,174,400 B1 and US 2011/0079733 A1. The organic luminophore can be used here as a pure substance, or be applied to a carrier material in diluted form. In general, pure substances are preferred when the security feature is used in printing inks, lacquers and polymers, and application in carrier materials is preferred when the security feature is embedded into the paper pulp. For stabilization in a carrier material, the organic luminophore can be embedded for example into polymers, e.g. in the form of polymer microspheres. Likewise, it is possible to attach organic luminophores to inorganic media having a high external or internal surface, for example layer silicates, zeolites or porous oxides such as mesoporous silica. The preferred proportion of the organic luminophore, or of the organic luminophore integrated into a carrier material, in the security feature amounts to 1 to 30%, preferably 5 to 20%.

The security feature has 20% to 80% of the luminescent component, preferably 25% to 60%, particularly preferably 30% to 50% (all percentages as well as following and preceding percentages being by weight). The luminophore involved here is one emitting in the non-visible spectral region and consisting of a doped host lattice. Preferably, the luminophores possess high quantum yields or signal intensities and suitable decay times in order to guarantee error-free testability even with small quantities used in the value documents and at high moving speeds as occur for example in bank-note processing machines having a processing speed of up to 40 bank notes per second or more. Suitable luminophores for the luminescent component are for example inorganic crystalline matrices such as oxides, e.g. in the form of garnets, spinels or perovskites, as well as oxysulfides, sulfides, silicates, phosphates, aluminates, niobates, tantalates, vanadates, germanates, arsenates, zirconates or wolframates which are doped with rare earths and/or transition metals and possess decay times in the range between 50 µs and 10 ms.

The camouflaging component is contained in the security feature in a proportion of 20% to 80%, preferably 40% to 70%, particularly preferably 50% to 70%. Besides the camouflaging component, further, non-camouflaging components can also be contained in the security feature.

When the camouflaging component contains a substance that hides the X-ray diffractogram of the luminescent component, its quantity used depends on the quantity and relative crystallinity of the luminescent component. This means that the relative intensity of the camouflaging component, in a diffractogram of the mixture with the luminescent component, sufficiently hides the latter in the overlap regions. When the luminescent component shows only a low signal in the diffractogram e.g. due to a small grain size or a small proportion in the mixture, or when the camouflaging component has an especially high signal in the diffractogram due to its high crystallinity or suitable composition, less material of the camouflaging component, or of the substance having the overlapping X-ray diffractogram contained in the camouflaging component, must be used altogether to achieve the desired camouflage effect. To obtain a distortion of the diffractogram that is sufficient for camouflage, the camouflaging component causes in the overlapping region of the diffractogram of the luminescent component a relative change of the surface integral of an overlapping peak of the luminescent component of at least 20%, preferably at least 40%, particularly preferably at least 60%, very particularly preferably at least 80%.

The camouflaging component must be added to the security feature here in such a quantity that upon X-ray powder diffractometry of the security feature the respective peaks of the camouflaging component and luminescent component are comparably strong. The X-ray diffractograms of the camouflaging component and luminescent component must not be identical or highly similar here, since this would not impede, but rather facilitate an analysis. The substances used should thus not be structurally related. However, it is likewise unfavorable when the peak positions of the two X-ray diffractograms show no match, since in this case it is especially easy to separate into the single components. Preferably, the camouflaging component is used in a form so that at least one, preferably two, particularly preferably three, relevant peak positions of the camouflaging component match corresponding peak positions of the luminescent component. "Match" is to be understood here to mean that the peak maxima of the two peaks of the luminescent component and camouflaging component differ at most by 1°, preferably at most by 0.5°, particularly preferably at most by 0.2° (2Θ). "Relevant" is to be understood here to mean that the peak is sufficiently strong to be important for identifying the substance. Preferably, the at least one or two to three overlapping peaks have at least 20%, more preferably at least 30%, particularly preferably at least 50%, of the height of the main peak. Particularly preferably, one of the matching peaks is a main peak or both main peaks of the substances forming the luminescent component and the camouflaging component. This partial overlap impedes an identification and separation of the individual X-ray diffractograms. This is the case particularly when the camouflaging component has at least one substance whose X-ray diffractogram is not commonly known, i.e. is not contained in common structure databases. Besides the structure type itself, it is likewise possible to obtain inferences about the element content or the degree of distribution of stoichiometric or non-stoichiometric mixed compounds from the relative height of individual peaks. For example, many structures can, when the elements are exchanged at certain crystal positions, form homogeneous mixed series with different elements which differ only little in structure, specifically in the dimensions of the unit cell, but can be identified by their different relative peak heights. Hence, as an additional advantage, even upon successful identification and separation of the individual X-ray diffractograms the local overlap conceals the exact relative ratio between individual peak heights, thereby substantially impeding inferences about the exact stoichiometry of the camouflaged matrices.

To obtain such a match of certain peak positions of the substances of luminescent component and camouflaging component, it may be necessary to specifically adapt the lattice constants of the substance of the camouflaging component. This is preferably done by partial substitution of a lattice component by a suitable proportion of atoms with a larger and/or smaller radius. In the structures of certain substances this makes it possible to obtain a continuous change of the lattice parameters, e.g. a widening of the lattice through insertion of atoms with a larger atomic radius, thereby in turn shifting the peak positions of the X-ray diffractogram. As a further advantage, the peak positions of such partly substituted substances are often present in common X-ray structure databases only for certain individual substitutional proportions, thereby further impeding an analysis. For example, for a substance $A_2SiO_4$ with a substitution of A by B there are often found the variants of complete substitution $B_2SiO_4$, half substitution $ABSiO_4$, and no substitution $A_2SiO_4$, but not arbitrary ratios, e.g. $A_{0.21}B_{1.79}SiO_4$. For example, the diffractograms of the isostructural compounds $Ba_2SiO_4$, $BaCaSiO_4$ and $Ca_2SiO_4$ are known. The positions of the two strongest XRD peaks here are respectively 29.4° and 30.4° for $Ba_2SiO_4$, 30.6° and 31.5° for $BaCaSiO_4$, and 32.0° and 32.5° for $Ca_2SiO_4$. However, arbitrary intermediate states can be produced in order to adapt the positions of the peaks. This makes it possible to improve the overlap of the diffractogram with the luminescent component. Simultaneously, finding the compound by utilizing X-ray structure databases is impeded.

Likewise, it is possible to strongly influence the relative intensity ratios of the individual peaks of an X-ray diffractogram by substitution with lighter and/or heavier atom types, even when their positions do not and only weakly change due to unvarying lattice parameters. In combination with the partial match of certain peaks of the mixture of substances of the luminescent and camouflaging components there can thus be generated an X-ray diffractogram that is especially hard to analyze.

Preferably, the luminescing component and the camouflaging component moreover possess the same or at least a similar density, so that they cannot easily be separated e.g. by sedimentation. Preferably, the deviation of the density of the camouflaging component from the density of the luminescent component amounts here to less than 50%, particularly preferably less than 30%.

By employing further components having different functionalities there can be achieved additional advantageous properties for the security feature, whereby an elevated security against imitation can additionally be obtained. The further components as well as the luminescent component and the camouflaging component can be mutually coordinated in their quantity and elemental composition as well as additionally in structural regard.

As a further component, a production component can be contained in the security feature. The security feature has 0-30%, preferably 0-20%, of the production component. The production component is employed in order to guarantee an unvarying quality or signal intensity of the security feature or of the luminescent component contained therein. Depending on manufacturing conditions such as the employed raw material batches and impurities contained therein, annealing parameters, grinding parameters, etc., there can occur an intensity fluctuation of the luminescence signal of the luminescent component. To compensate such fluctuations, the production component is added to the security element in a proportion in order to adjust the luminescence signal of the thus obtained security element to a specified nominal magnitude. This prevents the need, when using the security feature, to vary the respective metering when incorporating the security feature into value documents upon the above-described fluctuations. In contrast to the camouflaging component, the proportion of the production component is variable relative to the luminescent component, since the required proportion of the production component in the security feature depends on the respective production conditions, as described hereinabove.

It is not absolutely necessary, but preferred, that the production component involves a crystalline substance. In this case, it is further preferred that the peak positions of the X-ray diffractogram of the production component and of the camouflaging or luminescent component overlap at least partly in the above-described way. By this means, an X-ray analysis can be additionally impeded.

Moreover, it may be provided that an elemental analysis and separation of luminescent component, camouflaging component and production component is also prevented or at least impeded. For this purpose, the production component can have both at least one element of the substance forming the luminescent component and/or at least one element of the substance forming the camouflaging component. When the luminescent component and camouflaging component have for example the above-described elements A, B and C, the production component has at least one of the elements A, B or C. The production component can in addition have one or more further elements D, as well as oxygen and/or hydrogen.

A further component of the security feature can be formed by a coding component. The coding component is contained in the security feature in a proportion of 0 to 10%, preferably 0.5 to 4%, particularly preferably 1 to 3%. The coding component involves a substance which is employed as a forensic feature, by which e.g. different production batches, deliveries, manufacturers or processors can be marked. Preferably, the coding component is formed by a luminophore. However, the luminophore does not have to emit in the non-visible spectral region like the luminescent component, but can luminesce e.g. preferably in the visible spectral region. Since the coding component is designed as a forensic feature, it does not have to have the above-described properties for evaluation at high transport speed in bank-note processing machines. However, it should be made sure that the evaluation of the luminescent component is not adversely affected by the coding component. Preferably, the coding component hence differs as greatly as possible from the luminescent component in excitation and emission. The detection of the coding component can be effected via forensic methods, e.g. by the use of a fluorescence microscope or measurement by means of a special laboratory setup, whereby considerably longer measurement times (e.g. several minutes up to hours) in comparison to the luminescent component may also be necessary for reliable detection.

As a coding component there are preferably utilized collapsed zeolite structures loaded with rare earth metals and/or transition metals, as are described for example in DE 100 56 462 A1. These offer the advantage that zeolites can be loaded with a multiplicity of cations easily via ion exchange. It is likewise preferable to use matrices doped with rare earth metals and/or transition metals, which have narrow-band spectra in the vis region. Preferably, the dopants used here are the trivalent rare earth cations, luminescing in the vis region, of praseodymium, samarium, europium, terbium and dysprosium, and the matrices used are oxides, e.g. in the form of garnets, spinels or perovskites, as well as oxysulfides, sulfides, silicates, phosphates, aluminates, niobates, tantalates, vanadates, germanates, arsenates, zirconates or wolframates. Examples of such and further substances are described in the prints U.S. Pat. No. 3,980, 887, U.S. Pat. No. 4,014,812, U.S. Pat. No. 3,981,819 and WO 2006/047621 A1. In addition to the excitation spectrum or emission spectrum, the life of the luminescence can also be tested. The proportion of rare earth ions and/or transition metals in the coding component can be so high here that it is comparable to the concentration of rare earth metals and/or transition metals of the dopants of the luminescent component upon elemental analysis of the security feature. This impedes identification of the dopants employed for the luminescent component. As explained hereinabove in connection with the other components, it is preferred that the doping of coding component and luminescent component is also effected with different elements, since otherwise a chemical analysis is not impeded, but rather facilitated. Also, further cations not involved in the luminescence can be embedded into the zeolite structure or the luminophore matrix material in order to influence the elemental composition of the coding component.

Rare earth metals and/or transition metals can be added not only to the coding component but also to the production component and/or the camouflaging component, in order to additionally protect the dopant of the luminescent component. The quantities of rare earth metals and/or transition metals here are as described hereinabove in connection with the camouflaging of the dopants or with the coding component, i.e. the quantity of added rare earth metals and/or transition metals is comparable to the quantity of the dopants of the luminescent component.

Besides the production and coding components, the security feature can have added thereto further functional components which likewise do not necessarily have to involve a camouflaging effect. Examples of such additional components are e.g. dyes for adapting the color of the security feature, luminescence absorbers which suppress unwanted visible fluorescences of the security feature, or fluxing agents for adjusting the rheology of a powder forming the security feature.

Likewise, the luminescent component can have more than one luminescent substance, i.e. more than one luminophore. In this case, corresponding substances in the camouflaging component are preferably provided for each luminophore of the luminescent component. If this is e.g. not possible for technical reasons or involves elevated effort, it may be sufficient to camouflage only a single luminophore of a luminophore combination, since all luminophores of a luminophore combination must usually be identified for successful imitation of the security feature. In such cases, preferably only one of the several luminophores is protected by the camouflaging component. If similar substances are employed for the luminophores, e.g. like-kind matrices with different dopants, it can sometimes be sufficient to provide only respectively one individual substance in the camouflaging component for the similar substances of the luminescent component, in order to respectively obtain a camouflage of the structure or of the composition of both luminophores.

The security feature can be employed in the value documents for securing their authenticity and/or represent a coding of certain properties, for example of a currency and/or denomination, etc., if the value documents are bank notes.

Example 1

As a luminescent component (M) there is used a luminescent substance $CaNb_2O_6$:Nd consisting of a host lattice (matrix) of calcium niobate which is doped with neodymium, which was produced by annealing a mixture of 2.675 g $CaCO_3$, 7.234 g $Nb_2O_5$ and 0.092 g $Nd_2O_3$ for 10 h at 1150° C. Upon excitation at 532 nm the luminescent component emits at 1061 nm. The main peak in the diffractogram of the luminescent component lies here at 29.2°.

For structural camouflage (R) there can be used monoclinic $Zr(MoO_4)_2$ whose main peak lies at 29.1°. Simultaneously, through $Zr(MoO_4)_2$ the additional cationic elements Zr and Mo are incorporated for elemental camouflage (E). For camouflaging the stoichiometry (S) of the luminescent component, $Nb_2O_5$ can be added. $Nb_2O_5$ can likewise be used for production compensation (P). As a coding component (K) there is employed $CaTa_2O_6$:$Sm_{0.03}$ (emission at 610 nm). For camouflaging the dopants (D) there are employed small quantities of $Er_2O_3$ and $Yb_2O_3$.

A security feature comprising luminescent component and camouflaging component with production compensation and coding component then has for example the composition:

40% $CaNb_2O_6$:Nd (M)
30% $Zr(MoO_4)_2$ (R, E)
26% $Nb_2O_5$ (S, F)
2.5% $CaTa_2O_6$:Sm (K)
1% $Er_2O_3$ (D)
0.5% $Yb_2O_3$ (D)

Example 2

The luminescent component (M) is identical to the luminophore described in Example 1. The structure is not camouflaged. A camouflage of the stoichiometry (S) is obtained by adding $Ca_3(PO_4)_2$. The element P of the substance $Ca_3(PO_4)_2$ moreover effectuates an elemental camouflage (E). Additional cationic elements (E) Sr and Al are incorporated by adding $SrAl_2O_4$. As a production compensation (P) there is employed $Sr_3(PO_4)_2$. The elements Sr and P of the substance employed for the production compensation moreover effectuate an elemental camouflage (E). For camouflaging the dopants (D) there are used small quantities of $Yb_2O_3$ and $Tm_2O_3$. The coding component (K) is identical to that in Example 1.

A security feature comprising luminescent component and camouflaging component with production compensation and coding component then has for example the composition:

35% $CaNb_2O_6$:Nd (M)
20% $Ca_3(PO_4)_2$ (S, E)
20% $SrAl_2O_4$ (E)
20% $Sr_3(PO_4)_2$ (P, E)
3% $CaTa_2O_6$:Sm (K)
1% $Yb_2O_3$ (D)
1% $Tm_2O_3$ (D)

Example 3

On the basis of the substances from Example 1 the luminescence emission is additionally camouflaged by two organic luminophores (L). These involve a mixture of a tetranuclear neodymium complex with 2-thenoyltrifluoroacetone (HTTA) as a ligand, which fluoresces in the region of 1050-1100 nm, and the commercially available polymethine IR-1061 (Sigma Aldrich), which fluoresces in the region of 1020-1180 nm.

A security feature comprising luminescent component and camouflaging component with production compensation and coding component then has for example the composition:
30% $CaNb_2O_6$:Nd (M)
30% $Zr(MoO_4)_2$ (R, E)
26% $Nb_2O_5$ (S, P)
5% $Nd_4(TTA)_{10}O_{12}H_{22}$ (L)
5% IR-1061 (L)
2.5% $CaTa_2O_6$:Sm (K)
1% $Er_2O_3$ (D)
0.5% $Yb_2O_3$ (D)

Example 4

As a luminescent component (M) there is used a $Y_{1.98}Nd_{0.02}SiO_5$ which was produced by mixing 2.66 g urea, 0.53 g $SiO_2$, 6.72 g $Y(NO_3)_3.6H_2O$, 0.08 g $Nd(NO_3)_3.5H_2O$ and 3 mL $H_2O$, evaporating the liquid at 500° C., and annealing the obtained material at 1500° C. for 10 h. Upon excitation at 532 nm the luminescent component emits at 1075 nm.

A significant peak (>70% of main peak) in the X-ray diffractogram lies at 22.8°. For camouflaging the X-ray diffractogram (R) there can be employed $NaTaO_3$, whose main peak lies at 22.8°. The elements Na and Ta moreover effectuate an elemental camouflage (E). A camouflage of the stoichiometry (S) and incorporation of additional cationic elements (E) is obtained by adding $YAlO_3$. $YAlO_3$ can likewise be employed as a production compensation (P). For camouflaging the dopants (D) there are used small quantities of $Yb_2O_3$ and $Ce_2O_3$. As a coding component (K) there is employed LaOBr:Tb (emission at 543 nm).

A security feature comprising luminescent component and camouflaging component with production compensation and coding component then has for example the composition:
35% $Y_{1.98}Nd_{0.02}SiO_5$ (M)
30% $NaTaO_3$ (R, E)
31% $YAlO_3$ (S, E, P)
2% LaOBr:Tb (K)
1% $Yb_2O_3$ (D)
1% $Ce_2O_3$ (D)

Example 5

The luminescent component (M) is identical to the luminophore described in Example 4. For camouflaging the stoichiometry (S) and incorporating additional cationic elements (E) there is used $NaAlSiO_4$. As a production compensation (P) and for incorporating additional cationic elements (E) there is used $BaSO_4$. For camouflaging the dopants (D) there are used small quantities of $Tm_2O_3$ and $Sm_2O_3$. The coding component (K) is identical with that from Example 4.

A security feature comprising luminescent component and camouflaging component with production compensation and coding component then has for example the composition:
40% $Y_{1.98}Nd_{0.02}SiO_5$ (M)
30% $NaAlSiO_4$ (S, E)
26% $BaSO_4$ (P, E)
2% LaOBr:Tb (K)
1% $Tm_2O_3$ (D)
1% $Sm_2O_3$ (D)

Example 6

On the basis of the substances from Example 4 the luminescence emission is additionally camouflaged by an organic luminophore (L). The latter is IR-1048 (Sigma Aldrich), which fluoresces in the region of 1050-1150 nm.

A security feature comprising luminescent component and camouflaging component with production compensation and coding component then has for example the composition:
30% $Y_{1.98}Nd_{0.02}SiO_5$ (M)
30% $NaTaO_3$ (R, E)
30% $YAlO_3$ (S, E, P)
5% IR-1048 (L)
3% LaOBr:Tb (K)
1% $Yb_2O_3$ (D)
1% $Ce_2O_3$ (D)

Example 7

As a luminescent component (M) there is used a $KTiO(PO_4)$:Er which was produced by annealing a mixture of 18.78 g $KH_2PO_4$, 10.90 g $TiO_2$ and 0.61 g $Er_2O_3$ at 800° C. for 12 h. Upon excitation at 520 nm the luminescent component emits at 1540 nm. The main peak in the diffractogram of the luminescent component lies at 32.3°, with a closely adjacent significant peak (>70% of the main peak) at 32.6°. For camouflaging the X-ray diffractogram (R) there can be used $LaMnO_3$, which possesses two significant peaks (90-100% of the main peak) at 32.3° and 32.6° in the diffractogram. The elements La and Mn moreover effectuate an elemental camouflage (E). For camouflaging the stoichiometry (S) there can be added $TiO_2$, which can simultaneously be employed as a production compensation (P). For camouflaging the dopants (D) there are used small quantities of $Nd_2O_3$, $Ce_2O_3$ and $Ho_2O_3$. The coding component (K) is $Y_2SiO_5$:Ce, which emits at 420 nm.

A security feature comprising luminescent component and camouflaging component with production compensation and coding component then has for example the composition:
30% $KTiO(PO_4)$:Er (M)
30% $LaMnO_3$ (R, E)
35% $TiO_2$ (S, P)
2% $Y_2SiO_5$:Ce (K)
1% $Ce_2O_3$ (D)
1% $Nd_2O_3$ (D)
1% $Ho_2O_3$ (D)

Example 8

The luminescent component (M) is identical to the luminophore described in Example 7. For camouflaging the stoichiometry (S) and incorporating additional cationic elements (E) there is employed $CaTiO_3$. Additional cationic elements (E) are incorporated by adding $ZrSiO_4$, which can simultaneously serve as a production compensation (P). For camouflaging the dopants (D) there are used small quantities of $Nd_2O_3$, $Ce_2O_3$ and $Ho_2O_3$. The coding component (K) is identical to that in Example 7.

A security feature comprising luminescent component and camouflaging component with production compensation and coding component then has for example the composition:

30% $KTiO(PO_4)$:Er (M)
30% $CaTiO_3$ (S, E)
35% $ZrSiO_4$ (E, P)
2% $Y_2SiO_5$:Ce (K)
1% $Ce_2O_3$ (D)
1% $Nd_2O_3$ (D)
1% $Ho_2O_3$ (D)

Example 9

On the basis of the substances from Example 8 the luminescence emission is additionally camouflaged by an organic luminophore (L). The latter is the acyclic erbium complex acyc-H, as is described in the literature source "L. Slooff, A. Polman, M. Oude Wolbers, F. van Veggel, D. Reinhoudt, J. Hofstraat; J. Appl. Phys. 83 (1) 1998, p. 497-503", which fluoresces in the region of 1480-1600 nm.

A security feature comprising luminescent component and camouflaging component with production compensation and coding component then has for example the composition:

28% $KTiO(PO_4)$:Er (M)
28% $CaTiO_3$ (S, E)
29% $ZrSiO_4$ (E, P)
10% acyc-H (L)
2% $Y_2SiO_5$:Ce (K)
1% $Ce_2O_3$ (D)
1% $Nd_2O_3$ (D)
1% $Ho_2O_3$ (D)

The invention claimed is:

1. A security feature having a luminescent component having at least one luminophore consisting of a doped host lattice, and a component camouflaging the luminescent component,
wherein an identification of the luminescent component is impeded or prevented by properties of the camouflaging component and respective like-kind properties of the luminescent component being characterized by the following relations:
a) the camouflaging component has a X-ray diffractogram that at least partly overlaps with, but is not identical to, the X-ray diffractogram of the luminescent component, in order to camouflage the structure of the luminescent component,
b) the camouflaging component contains at least one cationic element that is also contained in a host lattice of the luminescent component, but not all cationic elements contained in this host lattice, in order to camouflage the stoichiometry of the luminescent component,
c) the camouflaging component contains at least one cationic element that is not contained in a host lattice of the luminescent component, in order to camouflage the elemental constitution of this host lattice of the luminescent component,
d) the camouflaging component contains at least one dopant that is not contained as a dopant in the luminescent component, in order to camouflage the dopant or dopants of the luminescent component,
e) the camouflaging component contains at least one luminophore that has a lower decay time than the luminophore contained in the luminescent component, in order to camouflage the spectral properties of the luminescent component,
said security feature being further wherein the properties of the camouflaging component and of the luminescent component satisfy relation a) and at least one of the relations stated in b) to e).

2. The security feature according to claim 1, wherein the camouflaging component and the luminescent component satisfy the relations a) and b).

3. The security feature according to claim 1, wherein the camouflaging component and the luminescent component satisfy the relations a), b), c) and d).

4. The security feature according to claim 1, wherein the camouflaging component and the luminescent component satisfy the relations a) and e).

5. The security feature according to claim 1, wherein the camouflaging component and the luminescent component satisfy the relations a), b), c), d) and e).

6. The security feature according to claim 1, wherein the X-ray diffractogram of the luminescent component and the X-ray diffractogram of the camouflaging component have a partial overlap in significant peaks, with at least one relevant peak position overlapping.

7. The security feature according to claim 6, wherein the overlapping peaks have at least 30% of the height of a main peak.

8. The security feature according to claim 6, wherein the overlapping peaks are a main peak of luminescent component and camouflaging component.

9. The security feature according to claim 1, wherein the cationic elements are selected from the main group elements Li, Be, B, Na, Mg, Al, Si, P, S, K, Ca, Ga, Ge, As, Se, Rb, Sr, In, Sn, Sb, Te, Cs, Ba, Tl, Pb, Bi or the elements of the transition metals or the rare earth elements.

10. The security feature according to claim 1, wherein the dopant of the luminescent component is a rare earth element, and the camouflaging component contains at least one dopant consisting of the elements of the rare earths Ce, Pr, Nd, Sm, Eu, Tb, Dy, Ho, Er, Tm, Yb.

11. The security feature according to claim 1, wherein the dopant of the luminescent component is a transition metal of the fourth period of the periodic system, and the camouflaging component contains at least one other dopant consisting of the elements of the fourth period of the periodic system.

12. The security feature according to claim 1, wherein the luminophore of the camouflaging component is an organic luminophore.

13. The security feature according to claim 1, wherein the luminophore has a decay time of less than 10 μs.

14. The security feature according to claim 1, wherein the camouflaging component has, in addition to the at least partly overlapping X-ray diffractogram, at least one further structural feature that at least partly match corresponding structural features of the luminescent component, in order to camouflage the structure of the luminescent component,
wherein the at least one further structural feature comprises at least a production component or a coding component.

15. A value document having a security feature according to claim 1, wherein the value document consists of paper and/or plastic.

16. The value document according to claim 14, wherein the security feature is incorporated into the volume of the value document and/or applied to the value document.

17. The value document according to claim 14, wherein the security feature is applied to the value document as an invisible, at least partial coating.

18. A security feature having a luminescent component having at least one luminophore consisting of a doped host lattice, and a component camouflaging the luminescent component,
   wherein an identification of the luminescent component is impeded or prevented by properties of the camouflaging component and respective like-kind properties of the luminescent component being characterized by the following relations:
   a) the camouflaging component contains at least one cationic element that is also contained in a host lattice of the luminescent component, but not all cationic elements contained in this host lattice, in order to camouflage the stoichiometry of the luminescent component,
   b) the camouflaging component contains at least two cationic elements that are not contained in a host lattice of the luminescent component in a quantity of at least 30% of the molar quantity of a cationic matrix element, in order to camouflage the elemental constitution of this host lattice of the luminescent component,
   c) the camouflaging component contains at least two dopants that are not contained as a dopant in the luminescent component, in order to camouflage the dopant or dopants of the luminescent component,
   d) the camouflaging component contains at least one luminophore that has a lower decay time than the luminophore contained in the luminescent component, in order to camouflage the spectral properties of the luminescent component,
   said security feature being further wherein the properties of the camouflaging component and of the luminescent component satisfy all four of the relations stated in a) to d).

* * * * *